United States Patent
Ohuchi et al.

(10) Patent No.: US 7,441,459 B2
(45) Date of Patent: Oct. 28, 2008

(54) TUNING-FORK TYPE TRANSDUCER FOR ANGULAR-SPEED SENSOR, ANGULAR-SPEED SENSOR USING THE SAME TRANSDUCER, AND AUTOMOTIVE VEHICLE USING THE SAME ANGULAR-SPEED SENSOR

(75) Inventors: Satoshi Ohuchi, Hyogo (JP); Takeshi Yamamoto, Shiga (JP); Hiroyuki Aizawa, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 10 days.

(21) Appl. No.: 10/589,124

(22) PCT Filed: Mar. 1, 2005

(86) PCT No.: PCT/JP2005/003359

§ 371 (c)(1),
(2), (4) Date: Aug. 11, 2006

(87) PCT Pub. No.: WO2005/085758

PCT Pub. Date: Sep. 15, 2005

(65) Prior Publication Data

US 2007/0163344 A1    Jul. 19, 2007

(30) Foreign Application Priority Data

Mar. 5, 2004    (JP)    ............... 2004-061966

(51) Int. Cl.
*G01P 9/04*    (2006.01)
*G01C 19/56*    (2006.01)

(52) U.S. Cl. .................. 73/504.16; 73/504.12

(58) Field of Classification Search ............. 73/504.16, 73/504.12, 504.04, 504.15; 310/370
See application file for complete search history.

(56) References Cited

U.S. PATENT DOCUMENTS

| | | | | | |
|---|---|---|---|---|---|
| 3,697,766 | A | * | 10/1972 | Ganter et al. | ............... 310/348 |
| 5,939,631 | A | * | 8/1999 | Moore | ............... 73/504.16 |
| 6,018,996 | A | | 2/2000 | Matsuhiro et al. | |
| 6,564,639 | B1 | * | 5/2003 | Hatanaka et al. | ......... 73/504.16 |
| 6,865,945 | B2 | * | 3/2005 | Hayashi et al. | .......... 73/504.16 |
| 6,880,399 | B1 | * | 4/2005 | Okoshi et al. | ................. 73/493 |

(Continued)

FOREIGN PATENT DOCUMENTS

JP    09-273933    10/1997

(Continued)

*Primary Examiner*—Helen C. Kwok
(74) *Attorney, Agent, or Firm*—McDermott Will & Emery LLP (57) ABSTRACT

The invention provides a tuning-fork type transducer for an angular-speed sensor which realizes a stable fork-driving, realizes downsizing of the angular-speed sensor, and is capable of executing control of a vehicle body with high degree of accuracy when being used under a high-temperature environment, an angular-speed sensor using this transducer, and an automotive vehicle using this angular-speed sensor. Electric charges obtained from upper electrodes (13a), (14a) provided on an arm (10b) are amplified respectively by current amplifiers (40a), (40b). The amplified signal is differentially amplified by a first differential amplifier (41), and the amplified signal is used as a monitor signal for fork-driving. An added signal obtained by adding output signals from the current amplifiers (40a), (40b) by an adder (60) is used as a signal for detecting the angular speed.

11 Claims, 4 Drawing Sheets

U.S. PATENT DOCUMENTS

| | | | |
|---|---|---|---|
| 6,931,927 B2 * | 8/2005 | Ohta et al. | 73/504.16 |
| 7,002,284 B2 * | 2/2006 | Ouchi et al. | 310/370 |
| 7,176,604 B2 * | 2/2007 | Nakatani | 310/370 |
| 2004/0095046 A1 | 5/2004 | Ouchi et al. | |

FOREIGN PATENT DOCUMENTS

| | | |
|---|---|---|
| JP | 10-339637 | 12/1998 |
| JP | 11-173850 | 7/1999 |
| JP | 2003-227719 | 8/2003 |

* cited by examiner

TUNING-FORK TYPE TRANSDUCER FOR ANGULAR-SPEED SENSOR, ANGULAR-SPEED SENSOR USING THE SAME TRANSDUCER, AND AUTOMOTIVE VEHICLE USING THE SAME ANGULAR-SPEED SENSOR

RELATED APPLICATION

This application is a national phase of PCT/JP2005/003359 filed on Mar. 1, 2005, which claims priority from Japanese Application No. 2004-061966 filed on Mar. 5, 2004, the disclosures of which Applications are incorporated by reference herein. The benefit of the filing and priority dates of the International and Japanese Applications is respectfully requested.

TECHNICAL FIELD

The present invention relates to a tuning-fork type transducer for an angular-speed sensor which realizes a stable fork-driving and downsizing of the angular-speed sensor, is stable even when it is used under a high-temperature environment and, in addition, is able to realize control of a vehicle body with high degree of accuracy, an angular-speed sensor using this transducer, and an automotive vehicle using this angular-speed sensor.

BACKGROUND ART

Figure 4:
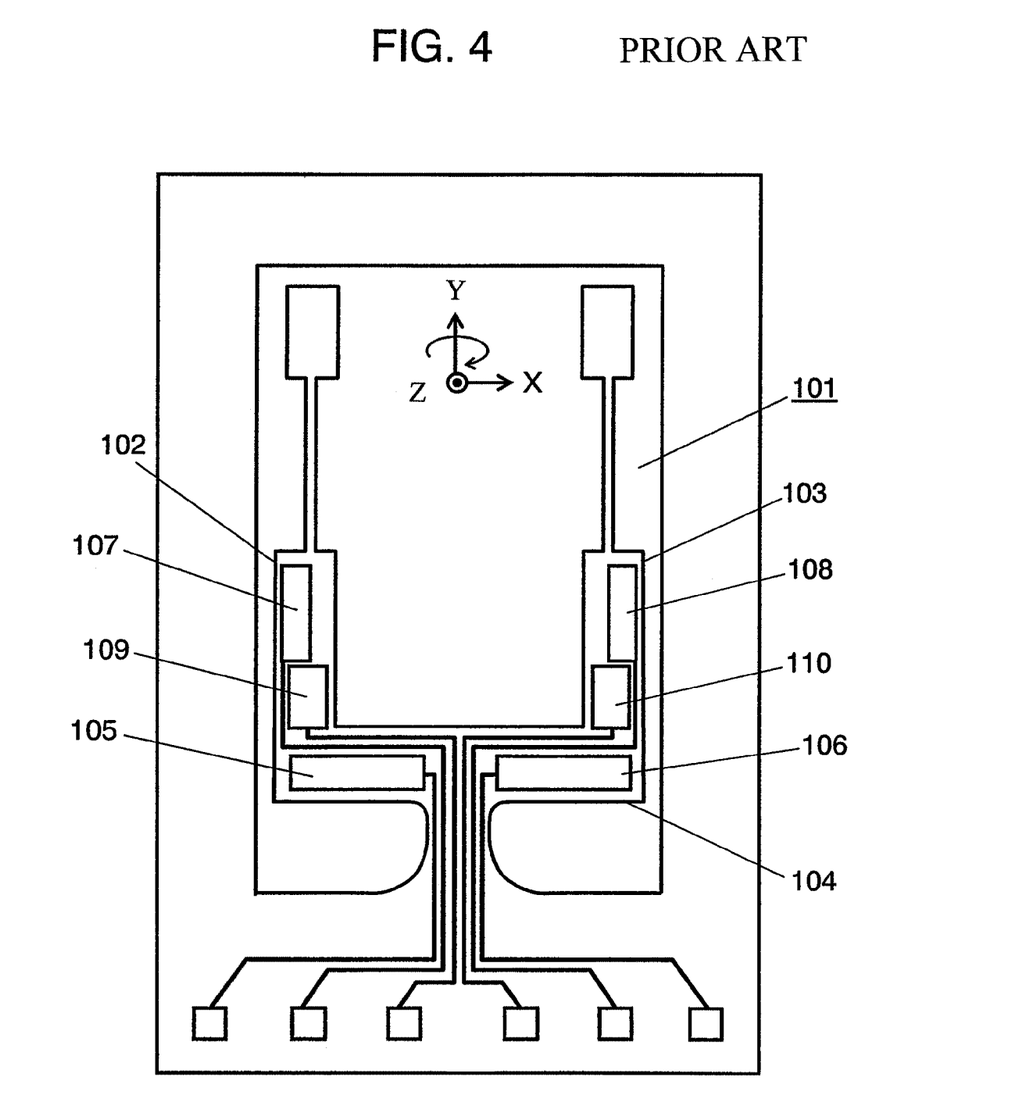
FIG. 4 is a plan view of a transducer of an angular-speed sensor in the related art.

In the related art, an angular-speed sensor of this type is introduced, for example, in Japanese Patent Unexamined Publication No. 11-173850. FIG. 4 is a plan view of an angular-speed sensor transducer presented in this publication.

In FIG. 4, tuning-fork type transducer 101 formed of silicon includes arms 102, 103. Arms 102, 103 are connected by base portion 104. Base portion 104 for causing arms 102, 103 to perform fork oscillation in the X-axis direction is formed with drive element members 105, 106. Monitor element members 107, 108 are formed on arms 102, 103 separately for monitoring amplitude of the fork oscillation in the X-axis direction of arms 102, 103. Detection element members 109, 110 are formed on arms 102, 103 for detecting the angular speed.

When an alternating-current signal is applied to drive element members 105, 106, arms 102, 103 perform the fork oscillation in the X-axis direction. Monitor element members 107, 108 are provided on arms 102, 103 at outer sides of the center lines of the shorter direction thereof.

Accordingly, monitor element members 107, 108 generate alternating-current signals of the same phase with respect to each other. Arms 102, 103 are controlled in response to output signals from monitor element members 107, 108 so as to achieve the fork oscillation of predetermined amplitude. When an angular speed is applied to arms 102, 103 about a Z-axis thereof when being in fork oscillation in the X-axis direction, arms 102, 103 are bent in a Y-axis direction thereof in the direction apart from each other. The magnitude of the applied angular speed can be found by detecting the bending by detection element members 109, 110.

In the angular-speed sensor in the related art as described above, monitor element members 107, 108 are provided separately on arms 102, 103 at outer sides of the center lines thereof. Therefore, the alternating-current signals of the same phase with respect to each other are generated. Therefore, there arises a problem such that monitor element members 107, 108 cannot cancel a noise to be removed at the time of the fork-driving in the X-axis direction, and hence are driven according to monitor signals containing the noise mixed therein.

Since drive element members 105, 106, monitor element members 107, 108 and detection element members 109, 110 must be provided independently on tuning-fork type transducer 101, it is difficult to realize downsizing of the angular-speed sensor. Since driving element members 105, 106, monitor element members 107, 108, and detection element members 109, 110 are provided independently on tuning-fork type transducer 101, when being used under a high-temperature environment as in the case of an automotive vehicle, the rate of variation in temperature is not uniform among the elements, and hence the respective elements are subjected to different changes over time. Therefore, there arises a problem such that the normal angular-speed signal cannot be obtained.

The invention provides a tuning-fork type transducer for an angular-speed sensor which realizes a stable fork-driving, realizes downsizing of the angular-speed sensor, and is capable of executing control of a vehicle body with high degree of accuracy when being used under a high-temperature environment, an angular-speed sensor using this transducer, and an automotive vehicle using this angular-speed sensor.

DISCLOSURE OF INVENTION

A tuning-fork type transducer for an angular-speed sensor according to the invention includes a tuning fork having two arms and a base portion for connecting the arms and being formed of non-piezoelectric material. First piezoelectric films are provided on a main surface of at least one arm out of two arms which excite the tuning fork in the X-axis direction thereof so that upper electrodes thereof are apart from each other with a center line thereof as a boundary. Lower electrodes are formed under the first piezoelectric films. The first piezoelectric films, the upper electrodes thereof and the lower electrodes thereof may be formed on the two arms. However, it is practical to form the first piezoelectric films on one of the two arms, and the structure can be simplified thereby. Driving signals having phases reversed from each other are supplied to the upper electrodes.

Second piezoelectric films are formed on a main surface of at least one of the two arms for monitoring amplitude of the arm in the X-axis direction when the tuning fork performs fork-oscillation in the X-axis direction with the center line thereof as a boundary. The second piezoelectric films are formed with upper electrodes thereof and lower electrodes thereof so as to be apart from each other. Monitor signals having phases reversed from each other are outputted from these upper electrodes.

In this arrangement, since the two upper electrodes of the second piezoelectric films formed on the arm so as to be apart from each other with the center line thereof as a boundary are formed separately, noise can be cancelled when performing fork-driving in the X-axis direction.

The second piezoelectric films and the upper electrodes thereof and the lower electrodes thereof are formed at least on one of the two arms. These members may be formed not only on one of the arms, but also on the two arms.

In this arrangement, a disadvantage such that a driving signal is applied to the upper electrodes provided on the first piezoelectric films formed on the arm so as to be apart from each other with the center line thereof as a boundary on the basis of a monitor signal containing a noise mixed therein can be eliminated, and hence a stable fork-driving is achieved.

The first piezoelectric films are also formed on the main surface of the arm so as to be apart from each other with the center line thereof as a boundary corresponding to the upper electrodes formed thereon so as to be apart from each other with the center line thereof as a boundary. The lower electrodes are also formed so as to be apart from each other corresponding to the first piezoelectric films formed so as to be apart from each other. The second piezoelectric films are also formed on the arm so as to be apart from each other with the center line of the arm as a boundary corresponding to the upper electrodes formed on the main surface of the arm so as to be apart from each other with the center line thereof as a boundary. The lower electrodes thereof are also formed so as to be apart from each other correspondingly to the second piezoelectric films formed so as to be apart from each other. Since the driver and monitor member are provided separately and independently from each other with the center line of the arm as a boundary, oscillation with higher degree of accuracy can be generated in the X-axis direction and the Z-axis direction.

The first piezoelectric films formed on the arm so as to be apart from each other with the center line thereof as a boundary, and the upper electrodes formed thereon are arranged symmetrically with respect to the center line of the arm as a boundary. The upper electrodes formed on the second piezoelectric films formed on the arm so as to be apart from each other with the center line thereof as a boundary are arranged symmetrically with respect to the center line of the arm as a boundary. Accordingly, elimination of the noise with higher degree of accuracy is achieved by the monitor member, the fork-driving with higher stability are achieved.

In the tuning-fork type transducer for an angular-speed sensor, the upper electrodes, the second piezoelectric films and the lower electrodes in pairs formed on the arm so as to be apart from each other respectively with the center line thereof as a boundary are arranged symmetrically with respect to the center line as a boundary of the tuning fork. Accordingly, an advantage such that a large and stable monitor signal can be obtained is achieved.

In the tuning-fork type transducer for an angular-speed sensor according to the invention, since the tuning fork is a tuning-fork type transducer of a sensor formed of silicon, and a diffused stable semiconductor process technology is employed, an inexpensive transducer having a shape with higher degree of accuracy can be obtained.

According to the tuning-fork type transducer for an angular-speed sensor, the first piezoelectric films including the upper electrodes thereof formed on the arm so as to be apart from each other with the center line as a boundary, the second piezoelectric films including the upper electrodes thereof formed on the arm so as to be apart from each other with the center line thereof as a boundary, and the upper electrodes are arranged at positions shifted from the center portion in the length of the arm in the Y-axis direction toward the proximal side thereof. Accordingly, an advantage such that stable fork-driving against the disturbing oscillation is possible is achieved.

The angular-speed sensor includes a tuning-fork type transducer for an angular-speed sensor, a drive circuit, and an angular-speed detection circuit. The drive circuit includes a first amplifier for amplifying signals acquired from the second piezoelectric films formed on the arm so as to be apart from each other with the center line thereof as a boundary, and the upper electrodes formed thereon respectively. The first amplifier is not a single amplifier, and may be configured, for example, with two amplifying means which is referred to as a current amplifier.

A differential amplifier is provided for differentially amplifying the output signal from the first amplifier. An AGC circuit to which an output signal from the differential amplifier is fed, and a second amplifier to which an output signal from the AGC circuit is fed are provided. The second amplifier supplies driving signals having the phases reversed from each other are supplied to the respective upper electrodes formed on the first piezoelectric films formed on the arm so as to be apart from each other with the center line thereof as a boundary.

The angular-speed detection circuit provided separately from the drive circuit includes an adder in which either one of respective signals acquired from the first amplifier or respective signals acquired from the first piezoelectric films formed on the arm bent in the Z-axis direction of the arm so as to be apart from each other with the center line as a boundary and the upper electrodes formed thereon are added. A phase shifter for shifting the phase of the output signal from the adder and a synchronous demodulator for synchronously demodulating the output signal from the phase shifter on the basis of the output signal from the first amplifier or the output signal from the differential amplifier is provided.

In this arrangement, a structure for detecting the angular speed is not necessary, and hence downsizing of the angular-speed sensor can be realized and provided.

The angular-speed sensor according to the invention includes a tuning-fork type transducer for an angular-speed sensor, a drive circuit, and an angular-speed detection circuit. The drive circuit includes a first amplifier for amplifying signals acquired from the second piezoelectric films formed on the arm so as to be apart from each other with the center line as a boundary and the upper electrodes provided thereon respectively, and a first differential amplifier for differentially amplifies the output signal from the first amplifier. The first amplifier is not a single amplifier and may be configured with two amplifying means which is referred to as a current amplifier.

An AGC circuit to which an output signal from the first differential amplifier is fed, and a second amplifier to which an output signal from the AGC circuit is fed are provided. The second amplifier supplies driving signals having the phases reversed from each other to the first piezoelectric films formed on the arm so as to be apart from each other with the center line thereof as a boundary, and the respective upper electrodes formed thereon.

The angular-speed detection circuit provided separately from the drive circuit is provided with the second piezoelectric films formed on the arm, which is bent in the Z-axis direction thereof when an angular speed $\Omega$ is applied to the arm about the Y-axis, so as to be apart from each other with the center line thereof as a boundary. The respective signals acquired from the upper electrodes formed on the second piezoelectric films are amplified by the first amplifier. The amplified signals are added and combined in the first adder.

The angular-speed detection circuit includes a third amplifier for amplifying respective signals acquired from the first piezoelectric films and the upper electrodes formed thereon. A second adder for adding and combining the respective amplified signal is provided. The signal obtained by being added and combined in the second adder is amplified by the second differential amplifier. The output signal from the second differential amplifier is fed to the phase shifter and shifted by a predetermined phase. A synchronous demodulator for demodulating the output signal from the phase sifter by the output signal from the first amplifier or the output signal from the first differential amplifier is provided. In this arrangement, an advantage such that a larger angular-speed signal can be detected without additionally providing a circuit unit for detecting the angular speed is achieved.

An automotive vehicle according to the invention employs the angular-speed sensor as a sensor for detecting at least any one of yaw rate, rolling and pitching. Since the angular-speed sensor includes the portion for executing driving, the portion for detecting the reference signal (monitor signal) for controlling driving, and the portion for detecting the angular-speed signal as a common element, when it is used under a high-temperature environment as the automotive vehicle, the rate of temperature change can be maintained substantially constant even when the electric element which constitute the angular-speed sensor is subjected to changes over time. Therefore, an advantage such that the angular-speed signal is not substantially affected is achieved.

REFERENCE NUMERALS 1 tuning-fork type transducer
10a, 10b arms
11a, 12a, 13a, 14a, upper electrodes
11b, 12b first piezoelectric films
11c, 12c, 13c, 14c lower electrodes
11d, 12d, 13d, 14d conductive members
13b, 14b second piezoelectric films
18 base portion
30, 31 center lines
32, 33 main surface
40a, 40b current amplifiers
41 first differential amplifier
42 full-wave rectifier
43 AGC circuit
44 amplifier
45 reversing amplifier
46 drive circuit
60 adder
65 phase shifter
66 synchronous demodulator
67 low-pass filter
68 terminal
69 angular-speed detection circuit

BEST MODE FOR CARRYING OUT THE INVENTION

Referring now to the drawings, an embodiment of the invention will be described below.

Embodiment

Figure 1:
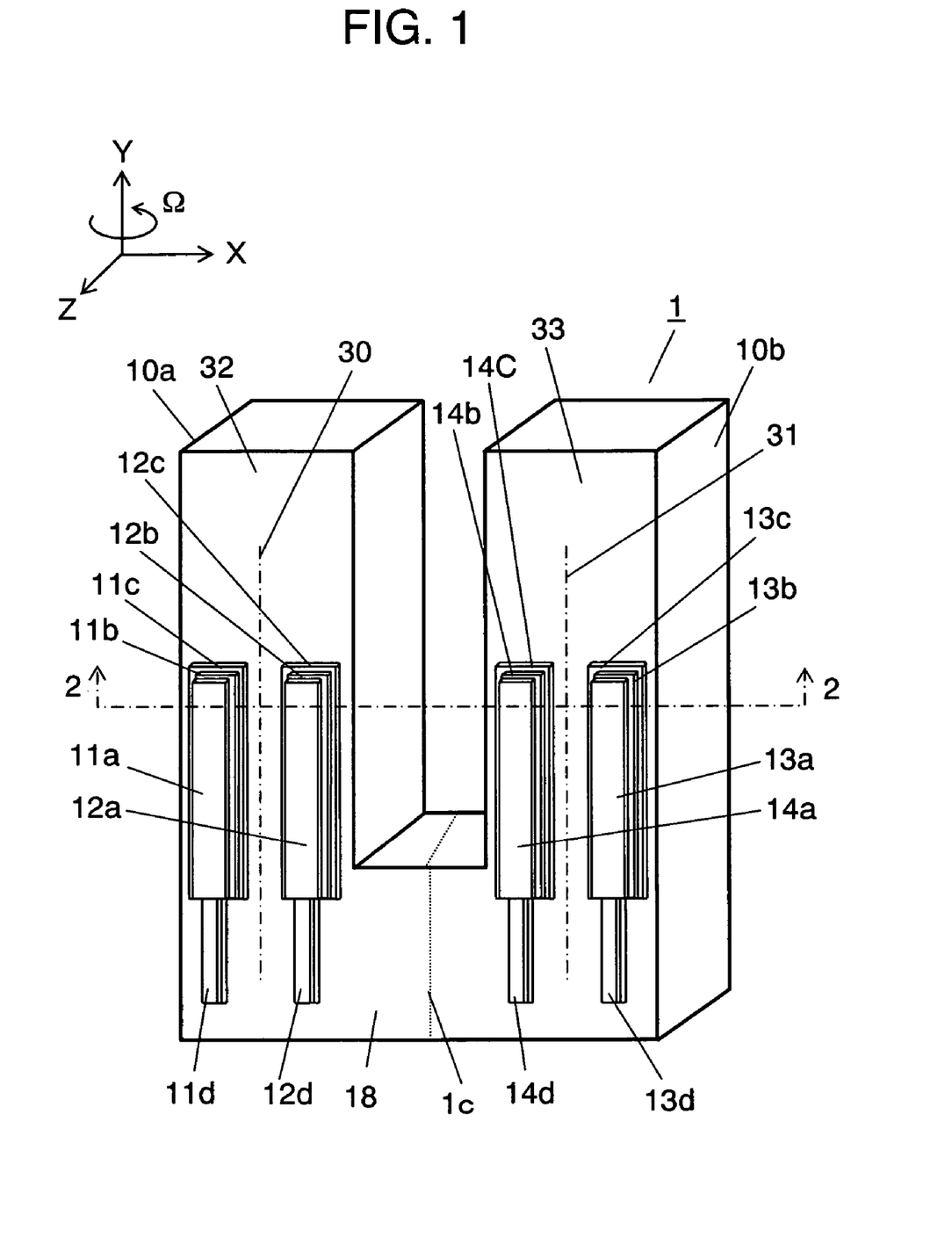
FIG. 1 is an exploded perspective view of a tuning-fork type transducer for an angular-speed sensor according to an embodiment of the invention.
Figure 2:
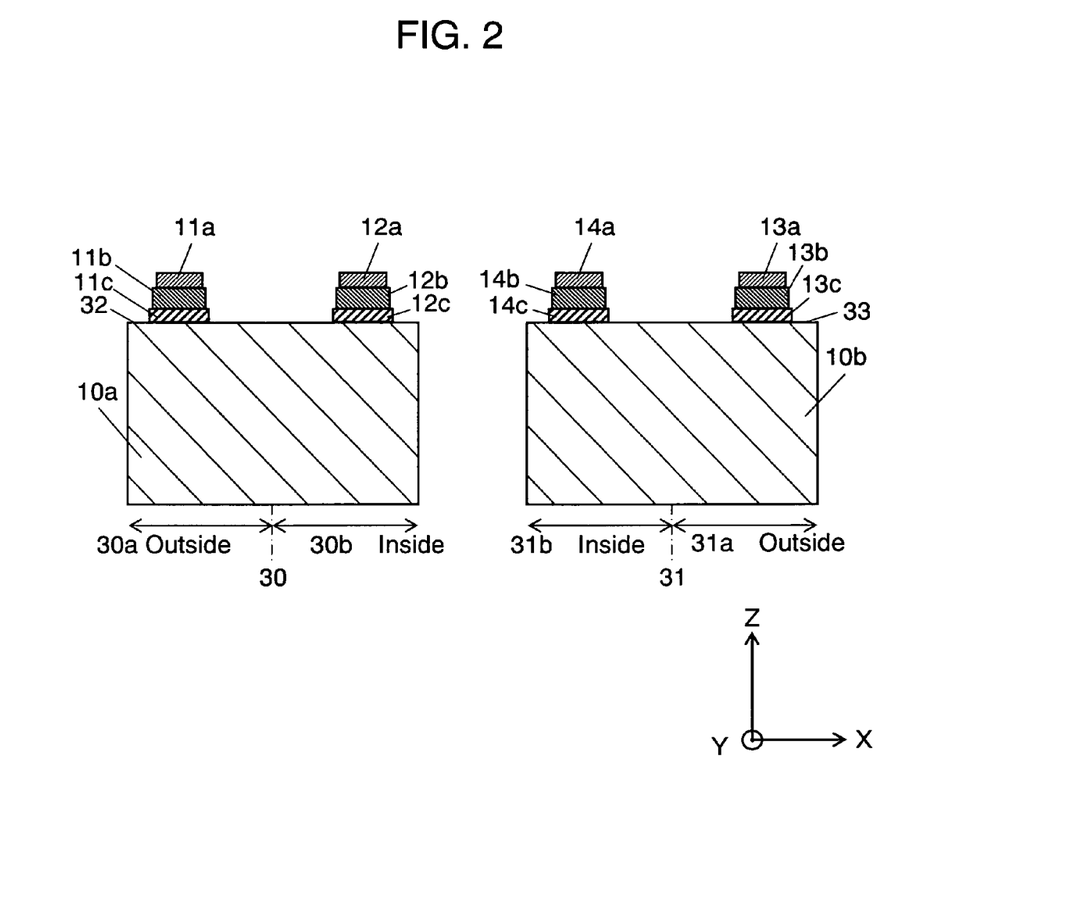
FIG. 2 is a cross-sectional view of the same transducer taken along the line 2-2 shown in FIG. 1.
Figure 3:
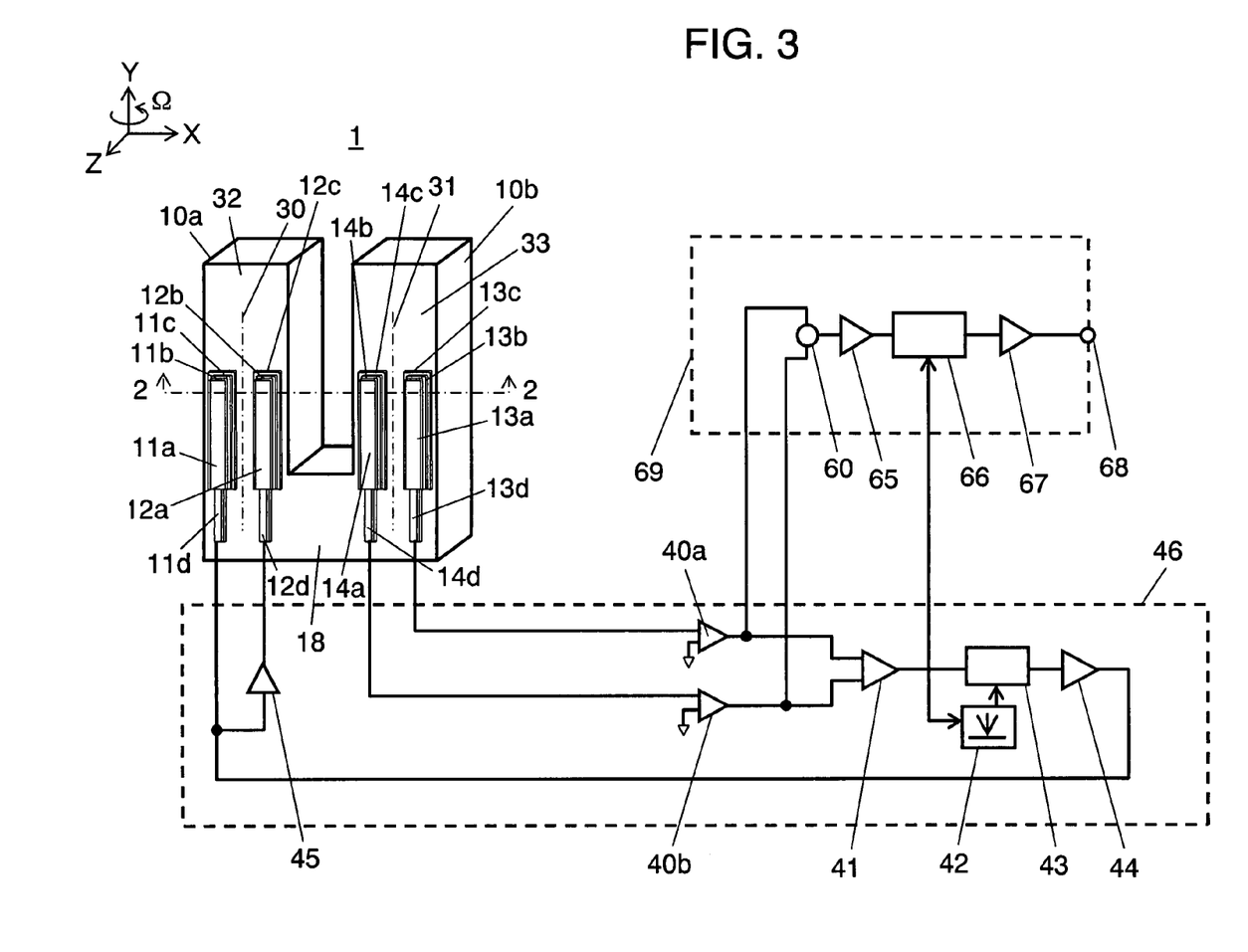
FIG. 3 is a circuit diagram of an angular-speed sensor using the same transducer.

FIG. 1 is an exploded perspective view of a tuning-fork type transducer for an angular-speed sensor according to an embodiment of the invention; FIG. 2 is a cross-sectional view of the same transducer taken along the line 2-2 shown in FIG. 1; and FIG. 3 is a circuit diagram of an angular-speed sensor using the same transducer.

In FIG. 1, tuning-fork type transducer 1 for an angular-speed sensor according to the invention includes arms 10a, 10b formed of non-piezoelectric material such as silicon. The lower portions of arms 10a, 10b in a longitudinal direction thereof, that is, the Y-axis direction when viewing FIG. 1 in a normal vision are connected by base portion 18. At a substantially center positions of arms 10a, 10b in the direction of the shorter side thereof, that is, in the X-axis direction, center lines 30, 31 of arms 10a, 10b are shown. Longitudinal surfaces of arms 10a, 10b are designated as main surfaces 32, 33.

We now give an eye to arm 10a. Lower layer electrodes 11c, 12c are formed on main surface 32 of arm 10a almost symmetrically with respect to center line 30 so as to be apart from each other. First piezoelectric films 11b, 12b are formed by polarizing a film surface formed of PZT in the vertical direction, and formed on lower electrodes 11c, 12c separately. Upper electrodes 11a, 12a have a function as driving electrodes and are formed on first piezoelectric films 11b, 12b separately. Conductive members 11d, 12d are connected to upper electrodes 11a, 12a separately, and are arranged on the lower end side of arm 10a, that is, at a position close to base portion 18.

Subsequently, we give an eye to arm 10b. Lower electrodes 13c 14c are formed on a main surface of arm 10b so as to be apart from each other with respect to center line 31 as a boundary. Second piezoelectric films 13b, 14b are both formed by polarizing a film surface formed of PZT in the vertical direction, and formed on lower electrodes 11c, 12c separately. Upper electrodes 13a, 14a, being upper electrodes for acquiring monitor signals and angular-speed detection signals, are formed separately on second piezoelectric films 13b, 14b.

Conductive members 13d, 14d are connected to upper electrodes 13a, 14a separately, and are arranged at a lower end portion of arm 10b, that is, at a position close to base portion 18. Conductive members 13d, 14d and conductive members 11d, 12d are arranged almost symmetrically with the intermediary of base portion 18.

A driver provided on arm 10a includes upper electrodes 11a, 12a, first piezoelectric films 11b, 12b and lower electrodes 11c, 12c. A pair of the drivers is arranged symmetrically with respect to center line 30 as a boundary. In the same manner, upper electrodes 13a, 14a, second piezoelectric films 13b, 14b and lower electrodes 13c, 14c are arranged on arm 10b as well symmetrically with respect to center line 31 as a boundary. Arms 10a and 10b are arranged in lateral symmetry with respect to center portion 1c of tuning-fork type transducer 1 as a boundary.

A structure of tuning-fork type transducer 1 shown in FIG. 1 is such that first piezoelectric films 11b, 12b, upper electrodes 11a, 12a thereof, and lower electrodes 11c, 12c thereof are arranged on one of two arms, that is, on arm 10a. Second piezoelectric films 13b, 14b, upper electrodes 13a, 14a thereof, and lower electrodes 13c, 14c thereof are arranged on the other arm, that is, on arm 10b. However, there are several choices in combination of arrangement which can be selected by those skilled in the art within a range of designing. For example, at least one of the first piezoelectric film and the second piezoelectric film may be formed on the two arms, instead of forming on one of the arms.

In FIG. 1, upper electrodes 11a, 12a as driving electrodes are formed on one arm 10a and upper electrodes 13a, 14a for acquiring monitor signals and angular-speed detection signals are formed on the other arm 10b, so that these electrodes are formed separately and independently. However, these electrodes may be formed on the same arm.

FIG. 2 is a cross-sectional view taken from a line of 2-2 in a tuning-fork type transducer 1 shown in FIG. 1. The same parts as in FIG. 1 are represented by the same reference numerals. Arm 10a shown on the left side in FIG. 2 in a normal vision includes outside 30a and inside 30b with respect to center line 30 thereof. Arm 10a includes main surface 32. Lower electrode 11c is formed on main surface 32 on outside 30a of arm 10a. Piezoelectric film 11b formed by polarizing the film surface of PZT in the vertical direction is formed on lower electrode 11c, and upper electrode 11a as a driving electrode is formed thereon.

In the same manner, lower electrode 12c, poled piezoelectric film 12b and upper electrode 12a are formed on main surface 32 of inside 30b of arm 10a in this order.

Arm 10b shown on the right side in FIG. 2 in normal vision includes outside 31a and inside 31b with respect to center line 31 as a boundary. Arm 10b includes main surface 33. Lower electrode 13c is formed on main surface 33 of outside 31a of arm 10b. Piezoelectric film 13b formed by polarizing the film surface of PZT in the vertical direction is formed on lower electrode 13c, and upper electrode 13a as a driving electrode is formed thereon.

In the same manner, lower electrode 14c, poled piezoelectric film 14b and upper electrode 14a are formed on main surface 33 of inside 31b of arm 10b in this order.

A detector includes a lower electrode (not shown) provided on main surface 32 of arm 10a, a piezoelectric film (not shown) formed by polarizing the film surface of PZT provided on the lower electrode in the vertical direction, and an upper electrode (not shown) provided on the piezoelectric film. In the same manner, on main surface 33 of arm 10b, a lower electrode (not shown), a piezoelectric film (not shown) formed by polarizing the film surface of PZT provided on the lower electrode in the vertical direction, and an upper electrode (not shown) provided on the piezoelectric film are formed.

The detector in this arrangement is provided almost symmetrically as well on left and right arms 10a, 10b with respect to center line 1c of tuning-fork type transducer 1 as a boundary.

In the same manner, a piezoelectric film (not shown) formed by polarizing the film surface of PZT and a lower electrode (not shown) are formed under monitor electrode 17.

FIG. 3 is an angular-speed sensor circuit according to the invention. The angular-speed sensor circuit includes three components of tuning-fork type transducer 1, drive circuit 46, and angular-speed detection circuit 69. Since a basic structure of tuning-fork type transducer 1 shown on the upper left side in FIG. 3 in normal vision is the same as that shown in FIG. 1, detailed description will be omitted.

Drive circuit 46 shown on a lower center portion in FIG. 3 in normal vision includes current amplifiers 40a, 40b, first differential amplifier 41, full-wave rectifier 42, AGC circuit 43, amplifier 44 and reversing amplifier 45.

A signal is fed to current amplifier 40a from conductive member 13d provided on the lower end side of arm 10a. A signal is fed to current amplifier 40b from conductive member 14d. Current amplifiers 40a, 40b are considered in combination as first amplifier instead of independent amplifiers.

An output signal from current amplifier 40a as one of the first amplifier is fed to one of the inputs of first differential amplifier 41. An output signal from current amplifier 40b in the first amplifier is fed to the other input. The output signal from first differential amplifier 41 is fed to AGC circuit 43 and full-wave rectifier 42. AGC circuit 43 controls an amplitude of a driving signal so that the magnitude of the amplitude of fork-oscillation of arms 10a, 10b in the X-axis direction so as to be set to a predetermined value. Full-wave rectifier 42 rectifies and smoothes the output signal from the first differential amplifier 41. An output signal from AGC circuit 43 is fed to amplifier 44. The output signal from amplifier 44 is, for example, a positive drive signal, and the drive signal is supplied via conductive member 11d to upper electrode 11a. The output signal from amplifier 44 is also fed to reversing amplifier 45. As the output signal from reversing amplifier 45, for example, a negative drive signal is acquired and the drive signal is supplied via conductive member 12d to upper electrode 12a. The respective drive signals supplied to upper electrodes 11a, 12a have phases reversed from each other, that is, a phase difference of 180°, and the amplitudes thereof are set to almost the same.

Angular-speed detection circuit 69 shown on the upper right side in FIG. 3 in normal vision includes adder 60, phase shifter 65, synchronous demodulator 66, low-pass filter 67, and terminal 68. Two output signals from current amplifier 40a and current amplifier 40b which constitutes a part of drive circuit 46 are fed to adder 60, where the output signals are added and combined. The phase of the combined signal added in adder 60 is shifted by a predetermined magnitude by phase shifter 65. The output signal from phase shifter 65 is fed to synchronous demodulator 66. An output signal from differential amplifier 41 is fed to synchronous demodulator 66, and on the basis of the output signal, the output signal from phase shifter 65 are synchronously demodulated. An output signal from synchronous demodulator 66 is fed to low-pass filter 67.

Referring now to FIG. 3, the operation of a fork-oscillation relating to the angular-speed sensor of the invention will be described. The phases of a positive driving signal to be supplied to upper electrode 11a formed on the side of tuning-fork type transducer 1 and a negative driving signal to be supplied to upper electrode 12a have a relation reversed from each other, that is, the phase difference is maintained at 180°, and the magnitudes of these amplitudes are set to about the same value.

Under such a condition setting, when the piezoelectric film 11b is bent in the Y-axis direction of arm 10a with center line 30 of arm 10a as a boundary, a force to bend arm 10a in the X-axis direction (outward direction) is generated. At the same time, a force to bend in the Z-axis direction (the direction from the inner side toward the near side) is also generated. Since the piezoelectric film 12b is expanded in the Y-axis direction with center line 30 of arm 10a as a boundary, a force to bend arm 10a in the X-axis direction (outward direction) is generated. Simultaneously, a force to bend the same in the Z-axis direction (the direction from the inner side toward the near side) is also generated. Consequently, forces to bend the left and right portions of arm 10a oppositely in the Z-axis direction with center line 30 of arm 10a as a boundary are balanced, and compensated, and hence oscillation in the X-axis direction (outward direction) is generated.

When arm 10a acts as described above, arm 10b osciollates in the X-axis direction (outward direction) which is opposite from arm 10a by the fork-oscillation. Therefore, second piezoelectric film 13b is contracted in the Y-axis direction with center line 31 of arm 10b as a boundary and, in contrast, second piezoelectric film 14b is expanded in the Y-axis direction. Accordingly, electric charges according to the amplitude of fork-oscillation having opposite phase from each other and the same magnitude are generated on upper electrodes 13a, 14a.

The electric charges generated on upper electrodes 13a, 14a are amplified by current amplifiers 40a, 40b respectively, and then the output signals therefrom are amplified by first differential amplifier 41. Accordingly, a large monitor signal for monitoring the amplification of the fork-oscillation can be obtained. In addition, a noise generated at the time of fork-oscillation in the X-axis direction can be cancelled since upper electrode 13a and upper electrode 14a are arranged symmetrically with respect to center line 31 of arm 10b as a boundary.

Therefore, a disadvantage such that a noise is mixed into the monitor signal and the driving signal affected thereby is supplied to upper electrodes 11a, 12a can be eliminated, and hence stable fork-driving is achieved. Even when arm 10b is bent in the Z-axis direction to some extent by disturbance, since electric charges having the same phase and the same magnitude are generated on upper electrodes 13a, 14a, and these electric charges are also cancelled, the operation to perform fork-driving in the X-axis direction is not affected.

Subsequently, a principle of detecting an angular-speed signal will be described. When an angular speed Ω is applied to arms 10a, 10b about the Y-axis when they are in fork-oscillation in an X-Y plane, arms 10a, 10b are bent in the opposite direction from each other in the Z-axis direction by a Corioli's force. Therefore, electric charges of the same phase and the same magnitude on the basis of the Corioli's force are generated on upper electrodes 13a, 14a formed on arm 10b. Electric charge generated on upper electrodes 13a, 14a are amplified respectively by current amplifiers 40a, 40b, and then the output signals therefrom are added by adder 60. Then, the added signal is fed to phase shifter 65. The output signal from phase shifter 65 is synchronously demodulated by the synchronous demodulator 66 the output signal from first differential amplifier 41. The output signal from synchronous demodulator 66 is introduced toward the outside as an angular-speed signal from terminal 68 through low-pass filter 67.

In this arrangement, since the electric charges having the opposite phases from each other and the same magnitude are added with the output signals from current amplifiers 40a, 40b by adder 60 and hence cancelled, a signal on the basis of the Corioli's force can be extracted as a monitor signal generated on upper electrodes 13a, 14a according to the amplitude of the fork-oscillation in the X-axis direction. In this arrangement, a configuration for detecting the angular speed is not necessary, and hence downsizing of the angular-speed sensor can be provided.

The example in which the detector for detecting the monitor signal is provided on arm 10b has been described in the invention. However, it is also possible to provide another pair of detectors for detecting the monitor signal on arm 10a. Accordingly, a larger and stable monitor signal can be obtained.

The configuration for detecting the angular speed from upper electrodes 13a, 14a provided on arm 10b has been described in the invention. In the same manner, it is also possible to employ a configuration in which the angular speed is detected from upper electrodes 11a, 12a provided on arm 10a. A first added signal can be obtained by amplifying the output signals from upper electrodes 13a, 14a provided on arm 10b bent in the Z-axis direction by current amplifiers 40a, 40b respectively, and then adding the respective output signals from current amplifiers 40a, 40b by adder 60.

A second added signal can be obtained by amplifying the output signals from upper electrodes 11a, 12a provided on arm 10a which is bent in the Z-axis direction and in the opposite direction from arm 10b by current amplifier (not shown) as third amplifier respectively, and then adding the respective output signals from these current amplifiers by an adder (not shown) different from adder 60.

The first added signal and the second added signal described above are differentially amplified by a second differential amplifier (not shown), and the output signal from the second differential amplifier is fed to phase shifter 65. Then, the output signal from phase shifter 65 is synchronously demodulated by synchronous demodulator 66 by the output signal from first differential amplifier 41. It is also possible to configure in such a manner that the output signal from synchronous demodulator 66 is passed through low-pass filter 67 from terminal 68 and outputted toward the outside as an angular-speed signal.

Accordingly, a larger angular-speed signal can be detected without adding a circuit unit for detecting the angular speed.

The example in which the driver is provided on one of the arms has been described in the invention. However, the driver must simply be provided at least on the main surface of at least one of the arms. In the same manner, the monitor member must simply be provided on the main surface of at least one of the arms.

The example in which the driver and the monitor member are provided on one of the arms independently with the center line thereof as a boundary has been described. However, at least the upper electrodes thereof must simply be provided on the arm so as to be apart from each other with the center line thereof as a boundary. As long as the driver and the monitor member are provided independently with the center line of the arm as a boundary, oscillation in the X-axis direction and the Z-axis direction can be generated with higher degree of accuracy.

Since the structure in which the driver and the monitor member are disposed in the vicinity of the proximal side with respect to the center portion of the arm in the longitudinal direction, that is, in the Y-axis direction is employed, a high degree of safety is achieved, and stable fork-driving against the disturbing oscillation is possible.

The example in which silicon as one of the non-piezoelectric materials is employed as the tuning-fork type transducer in view of such a circumstance that an inexpensive transducer having a shape with higher degree of accuracy can be obtained by using a semiconductor processing technology which is often used in general has been described. However, the invention is not limited thereto. For example, it is also possible to use diamond, fused quartz, alumina, GaAs, and so on. Alternatively, it is also possible to use piezoelectric material such as crystal quartz, $LiTaO_3$, $LiNbO_3$, and so on.

The angular-speed sensor according to the invention is described as including the portion for detecting the reference signal (monitor signal) for controlling the driving and the portion for detecting the angular-speed signal as a common element. In a case in which it is employed as a sensor for detecting at least any one of yaw rate, rolling and pitching under a high-temperature environment such as an automotive vehicle, even when the element is affected by changes over time, the temperature changes at the respective elements can be maintained uniformly. Therefore, since the angular-speed signal can keep down the influence of the temperature change, an automotive vehicle in which the vehicle body is controlled with extremely high degree of accuracy or an automotive vehicle which can achieve a high degree of safety is realized. It is the same even with the angular-speed sensor including the portion for executing driving and the portion for detecting the angular-speed signal as a common element.

INDUSTRIAL APPLICABILITY

An automotive vehicle including the tuning-fork type transducer for an angular-speed sensor, an angular-speed sensor using this transducer, and an automotive vehicle using this angular-speed sensor can realize the stable fork-driving, achieve downsizing of the angular-speed sensor, and realize a control of vehicle body with extremely high degree of accuracy also in usage under the high-temperature environment. Therefore, the industrial applicability thereof is high.

The invention claimed is:

1. A tuning-fork type transducer for an angular-speed sensor comprising:
    a tuning fork having two arms and a base portion for connecting the two arms and being formed of non-piezoelectric material;
    first piezoelectric films provided with upper electrodes and lower electrodes formed on a main surface of at least one arm out of the two arms which excite the tuning fork in the X-axis direction thereof so as to be apart from each other with a center line thereof as a boundary; and
    second piezoelectric films having upper electrodes and lower electrodes formed on a main surface of at least one of the two arms so as to be apart from each other with the center line thereof as a boundary for monitoring amplitude of the arm a X-axis direction when driving signals having the phases reversed from each other are supplied to the upper electrodes and hence the turning-fork performs fork-oscillation in the X-axis direction with the center line thereof as a boundary, the upper electrodes outputting monitor signals having the phases reversed from each other.

2. The tuning-fork type transducer for an angular-speed sensor of claim 1, comprising:
    the first piezoelectric films, the upper electrodes thereof and the lower electrodes thereof formed on the main surface of at least one of the two arms so as to be apart from each other with the center line thereof as a boundary; and
    the second piezoelectric films, the upper electrodes thereof and the lower electrodes thereof formed on the main surface of at least one of the two arms so as to be apart from each other with the center line thereof as a boundary.

3. The tuning-fork type transducer for an angular-speed sensor of claim 1, wherein the second piezoelectric films and the upper electrodes thereof are formed symmetrically with respect to the center line of the tuning-fork type angular-speed sensor as a boundary on one or the other one of the two arms.

4. The tuning-fork type transducer for an angular-speed sensor of claim 1, wherein the first piezoelectric films, the upper electrodes thereof, and the lower electrodes thereof are formed on one of the two arms, and the second piezoelectric films, the upper electrodes thereof and the lower electrodes thereof are formed on the other one of the two arms.

5. The tuning-fork type transducer for an angular-speed sensor of claim 4, wherein a pair of the first piezoelectric films and the upper electrodes thereof are formed symmetrically on the one arm with respect to the center line as a boundary.

6. The tuning fork type transducer for an angular-speed sensor of claim 4, wherein a pair of the second piezoelectric films and the upper electrodes thereof are formed symmetrically on the one arm with respect to the center line as a boundary.

7. The tuning-fork type transducer for an angular-speed sensor of claim 1, wherein the tuning fork is formed of silicon.

8. The tuning-fork type transducer for an angular-speed sensor of any one of claims 1 to 3, wherein at least two electrodes out of the first piezoelectric films and the upper electrodes thereof, and the second piezoelectric films and the upper electrodes thereof are disposed from a center portion of the length of the arm in a Y-axis direction toward a proximal side thereof.

9. An angular-speed sensor comprising:
    a tuning-fork type transducer for an angular-speed sensor of claim 1;
    a drive circuit; and
    an angular-speed detection circuit,
    the drive circuit including:
    a first amplifier for amplifying signals acquired from the second piezoelectric films formed on the arm so as to be apart from each other with the center line thereof as a boundary, and the upper electrodes formed thereon respectively;
    a differential amplifier for differentially amplifying the output signal from the first amplifier;
    an AGC circuit to which an output signal from the differential amplifier is fed, and a second amplifier to which an output signal from the AGC circuit is fed; and
    a second amplifier supplying driving signals having the phases reversed from each other are supplied to the respective upper electrodes formed on the first piezoelectric films formed on the arm so as to be apart from each other with the center line thereof as a boundary,
    the angular-speed detection circuit including:
    an adder in which either one of respective signals acquired from the first amplifier or respective signals acquired from the first piezoelectric films formed on the arm bent in the Z-axis direction of the arm so as to be apart from each other with the center line as a boundary and the upper electrodes formed thereon are added;
    a phase shifter for shifting the phase of the output signal from the adder; and
    a synchronous demodulator for synchronously demodulating the output signal from the phase shifter on the basis of the output signal from the first amplifier or the output signal from the differential amplifier.

10. An angular-speed sensor comprising:
    a tuning-fork type transducer for an angular-speed sensor of claim 1;
    a drive circuit; and
    an angular-speed detection circuit,
    the drive circuit including:
    a first amplifier for amplifying signals acquired from the second piezoelectric films formed on the arm so as to be apart from each other with the center line thereof as a boundary, and the upper electrodes formed thereon respectively;
    a first differential amplifier for differentially amplifying the output signal from the first amplifier;
    an AGC circuit to which an output signal from the first differential amplifier is fed, and a second amplifier to which an output signal from the AGC circuit is fed; and
    a second amplifier supplying driving signals having the phases reversed from each other are supplied to the respective upper electrodes formed on the first piezoelectric films formed on the arm so as to be apart from each other with the center line thereof as a boundary,
    the angular-speed detection circuit including:
    a first adder in which the respective signals acquired from the first amplifier is added;

a third amplifier for amplifying respective signals acquired from the first piezoelectric films and the upper electrodes formed thereon;

a second adder for adding signals amplified by the third amplifier;

a second differential amplifier for differentially amplifying the added signal obtained by being added in the second adder;

a phase shifter for shifting the phase of the output signal from the second differential amplifier; and a synchronous demodulator for synchronously demodulating the output signal from the phase sifter by the output signal from the first amplifier or the output signal from the first differential amplifier.

11. An automotive vehicle comprising the angular-speed sensor of claim 9 or claim 10 as a sensor for detecting at least any one of yaw rate, rolling and pitching.

* * * * *